J. & W. CARROTHERS.
Corn-Harvesters.

No. 139,367.  Patented May 27, 1873.

Witnesses:
Henry N. Miller
C. L. Evert

Inventor.
James Carrothers
Williamston Carrothers
per
Alexander Mason
Attorneys.

UNITED STATES PATENT OFFICE.

JAMES CARROTHERS AND WILLIAMSON CARROTHERS, OF NEWTON, IOWA.

IMPROVEMENT IN CORN-HARVESTERS.

Specification forming part of Letters Patent No. 139,367, dated May 27, 1873; application filed April 11, 1873.

*To all whom it may concern:*

Be it known that we, JAMES CARROTHERS and WILLIAMSON CARROTHERS, of Newton, in the county of Jasper and in the State of Iowa, have invented certain new and useful Improvements in Corn-Harvester; and do hereby declare that the following is a full, clear, and exact description thereof, reference being had to the accompanying drawing and to the letters of reference marked thereon making a part of this specification:

The nature of our invention consists in the mode of operating the knives of a corn-harvester, and is intended as an improvement upon the corn-harvester for which Letters Patent No. 134,251 were granted to us December 24, 1872.

In order to enable others skilled in the art to which our invention appertains to make and use the same, we will now proceed to describe its construction and operation, referring to the annexed drawing, in which—

Figure 1:
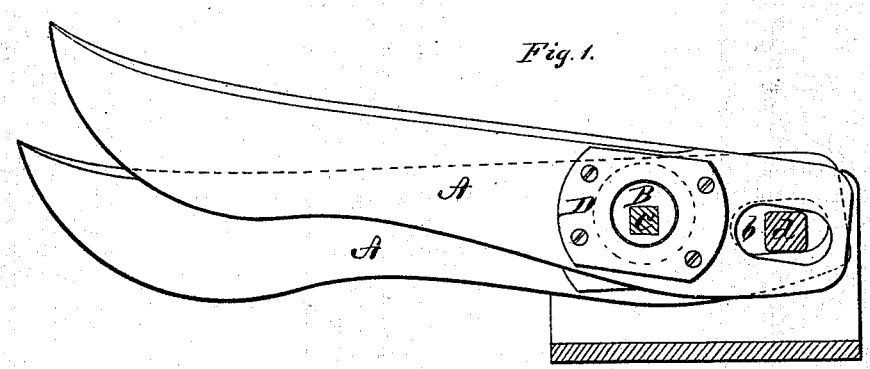
Figure 2:
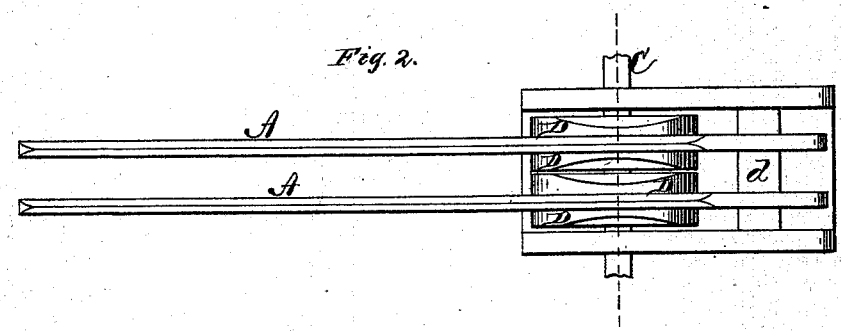
Figure 3:
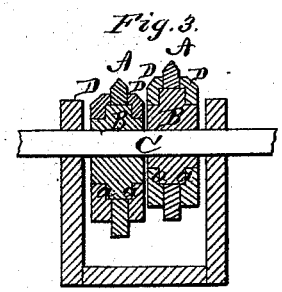

Figure 1 is a side view; Fig. 2, a plan view; and Fig. 3 a transverse section, showing two of our knives and the mode of operating the same.

A A represent two harvester-knives, constructed substantially in the same manner as described in our patent above referred to, except that the edge of the knife is in the center instead of at one side. This prevents the cornstalks from catching on the knives and breaking, as they often do, where the edge is on the side of the knife. Each knife is provided with a circular hole, in which is inserted a wheel, B, said wheel being placed upon and worked by a square shaft, C, running through all the wheels. The wheel B is fastened in the knife by two washers, D D, one on each side of the knife. Each eccentric-wheel, B, has an annular flange in its center, which lies in the recess formed therefor in each knife A. By this formation of the wheel an annular shoulder, a a, is had on each face of the wheel. The washers D D have each an annular groove, of size sufficient to be placed upon the shoulders a a, and are of a depth equal to the width of said shoulders, so that when applied to the wheels the ends of the latter will bear against each other, and the inner peripheries of the washers will be against the sides of the knives where they are screwed or bolted on. In the rear end of each knife is an oval or oblong slot, b, and through these slots passes a rod or bar, d, which may be adjusted up and down by means of a set-screw at each end, if so desired. The wheels or eccentrics B B are placed alternately in opposite directions on the shaft C and give the knives an up and down motion at the rear end, as well as at the forward end, thereby taking the ears of corn off the stalks better, especially ears that are high up on the stalks.

In our former patent above referred to the knives were placed on a straight shaft, with washers between them, and as the stalks of corn passed between them the ears that were quite high up on the stalks would draw back against the washers, and, as there was only a slight motion so far back on the knives, the ears would draw off, and sometimes the top. Our present improvement obviates this difficulty. It also gives the knives a forward and back motion by placing the eccentrics in the knives, and, as they are placed alternately in opposite directions, every other knife will move forward while the others move backward, and one-half of them lower than the other half, the lower ones always going forward and the higher passing back. The forward ends of the knives being higher than they are at the pivot point, causes them to readily take the ears off the stalks and throw them back. The shaft d, passing through the slots b in the rear ends of the knives, keeps them even on top, back of the eccentrics.

Having thus fully described our invention, what we claim as new, and desire to secure by Letters Patent, is—

1. The combination of the knife A, eccentric B placed on the shaft C, and the washers D D, all constructed and arranged substantially as and for the purposes herein set forth.

2. The combination of the knives A A operated by eccentrics B B and provided with slots b b, and the shaft d passing through said slots, as and for the purposes herein set forth.

In testimony that we claim the foregoing we have hereunto set our hands this 28th day of February, 1873.

JAMES CARROTHERS.
WILLIAMSON CARROTHERS.

Witnesses:
S. G. SMITH,
J. W. MONK.